United States Patent
Chen et al.

(10) Patent No.: US 12,301,007 B2
(45) Date of Patent: May 13, 2025

(54) PHOTOVOLTAIC ASSEMBLY SHUTOFF DEVICE, INVERTER, AND PHOTOVOLTAIC QUICK SHUTOFF SYSTEM AND STARTING METHOD THEREFOR

(71) Applicant: Sungrow Power Supply Co., Ltd., Hefei (CN)

(72) Inventors: Qiaodi Chen, Hefei (CN); Yu Yang, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 65 days.

(21) Appl. No.: 18/273,249

(22) PCT Filed: Mar. 2, 2022

(86) PCT No.: PCT/CN2022/078762
§ 371 (c)(1),
(2) Date: Jul. 19, 2023

(87) PCT Pub. No.: WO2022/199341
PCT Pub. Date: Sep. 29, 2022

(65) Prior Publication Data
US 2024/0195179 A1    Jun. 13, 2024

(30) Foreign Application Priority Data
Mar. 23, 2021   (CN) .......................... 202110307918.0

(51) Int. Cl.
*H02J 3/38* (2006.01)
*H02M 7/537* (2006.01)
(Continued)

(52) U.S. Cl.
CPC .............. *H02J 3/38* (2013.01); *H02M 7/537* (2013.01); *H02S 40/32* (2014.12); *H02S 50/10* (2014.12)

(58) Field of Classification Search
CPC ............ H02J 3/38; H02S 40/32; H02S 50/10; H02M 7/537
See application file for complete search history.

(56) References Cited

U.S. PATENT DOCUMENTS

2016/0329715 A1 * 11/2016 Orr ......................... H02S 50/10
2017/0207620 A1 *  7/2017 Zhu ................... H01L 31/02021
(Continued)

FOREIGN PATENT DOCUMENTS

| CN | 108054998 A | 5/2018 |
| CN | 109038669 A | 12/2018 |

(Continued)

OTHER PUBLICATIONS

International Search Report and Written Opinion for International Application No. PCT/CN2022/078762, mailed May 20, 2022.
(Continued)

*Primary Examiner* — Jared Fureman
*Assistant Examiner* — Duc M Pham
(74) *Attorney, Agent, or Firm* — Wolf, Greenfield & Sacks, P.C.

(57) ABSTRACT

A shutdown device for a photovoltaic module, an inverter, a rapid shutdown system, and a method for starting the rapid shutdown system are provided. The method is applied to the rapid shutdown system after each shutdown device in the rapid shutdown system initially starts. The shutdown device is switched into a mode of unlimited output in response to its success in initially starting. The shutdown device, in response to its failure to initially start or when being switched off, samples an electrical parameter at its output terminal in real time, determines whether the electrical parameter meets a preset starting condition, and switches
(Continued)

itself on and operates in the mode of unlimited output when the electrical parameter already meets the preset starting condition.

19 Claims, 6 Drawing Sheets

(51) Int. Cl.
  *H02S 40/32* (2014.01)
  *H02S 50/10* (2014.01)

(56) References Cited

U.S. PATENT DOCUMENTS

| | | |
|---|---|---|
| 2018/0248359 A1 | 8/2018 | Zou et al. |
| 2019/0027617 A1* | 1/2019 | Varlan ............... H02S 50/10 |
| 2019/0074684 A1* | 3/2019 | Craciun ............. H02S 40/32 |
| 2020/0335976 A1 | 10/2020 | Wei et al. |
| 2021/0218336 A1* | 7/2021 | Shkoury ............. H02J 1/08 |
| 2021/0281065 A1* | 9/2021 | Zhu ................... H02S 40/32 |
| 2021/0391710 A1 | 12/2021 | Yang et al. |
| 2023/0058643 A1 | 2/2023 | Yao et al. |
| 2023/0179146 A1 | 6/2023 | Yang et al. |

FOREIGN PATENT DOCUMENTS

| | | |
|---|---|---|
| CN | 109617523 A | 4/2019 |
| CN | 109818569 A | 5/2019 |
| CN | 110061692 A | 7/2019 |
| CN | 111585307 A | 8/2020 |
| CN | 111668868 A | 9/2020 |
| CN | 111864802 A | 10/2020 |
| CN | 112838618 A | 5/2021 |

OTHER PUBLICATIONS

First Office Action for Chinese Application No. 202110307918.0, dated Jul. 31, 2023.

\* cited by examiner

PHOTOVOLTAIC ASSEMBLY SHUTOFF DEVICE, INVERTER, AND PHOTOVOLTAIC QUICK SHUTOFF SYSTEM AND STARTING METHOD THEREFOR

This application is a national stage filing under 35 U.S.C. § 371 of International Patent Application Serial No. PCT/CN2022/078762, filed Mar. 2, 2022, which claims priority to Chinese Patent Application No. 202110307918.0, titled "SHUTDOWN DEVICE FOR PHOTOVOLTAIC MODULE, INVERTER, RAPID SHUTDOWN SYSTEM AND METHOD FOR STARTING THE SAME", filed on Mar. 23, 2021 with the China National Intellectual Property Administration. The contents of these applications are incorporated herein by reference in their entireties.

FIELD

The present disclosure relates to the technical field of grid-connected photovoltaic systems, and in particular to a shutdown device for a photovoltaic module, an inverter, a rapid shutdown system, and a method for starting the rapid shutdown system.

BACKGROUND

Photovoltaic systems are widely used with emerging technologies for the renewable energy. A photovoltaic array in a photovoltaic system outputs direct current power. The direct current power is converted into alternating current power by an inverter, and then the alternating current power is transmitted to a grid. In order to increase the power outputted by the photovoltaic system, multiple photovoltaic strings are usually connected in parallel and then are connected to the inverter. In addition, photovoltaic modules are connected to the inverter via respective shutdown devices. The shutdown device is switched off immediately when there is a safety hazard and is switched on timely for the corresponding photovoltaic string to output power to the grid, so as to secure the photovoltaic system.

At present, the shutdown device starts in response to a heartbeat sent by a central controller or a pulse periodically sent by a shutdown control module arranged on a direct current bus. However, a receiving module is indispensable to the shutdown device when starts in this manner, resulting in high cost of the shutdown device in terms of hardware.

SUMMARY

A shutdown device for a photovoltaic module, an inverter, a rapid shutdown system, and a method for starting the rapid shutdown system are provided according to the present disclosure, so as to solve the problem of high cost of the shutdown device in terms of hardware due to an additional receiving device.

The following technical solutions are provided according to embodiments of the present disclosure in order to solve the above problem.

A method for starting a rapid shutdown system is provided in a first aspect of the present disclosure. Multiple photovoltaic strings are connected in parallel and are connected to a direct current side of an inverter in the rapid shutdown system. The method includes: after each of shutdown devices in the rapid shutdown system initially starts, switching the shutdown device into a mode of unlimited output by the shutdown device in response to success of the shutdown device in initially starting; and sampling an electrical parameter at an output terminal of the shutdown device in real time, determining whether the electrical parameter meets a preset starting condition, switching the shutdown device on and operating the shutdown device in the mode of unlimited output in response to a determination result that the electrical parameter already meets the preset starting condition, by the shutdown device in response to failure of the shutdown device to start or when the shutdown device is switched off.

In an embodiment, the electrical parameter includes a voltage, and the determining whether the electrical parameter meets the preset starting condition comprises includes: determining whether the voltage is greater than or equal to a threshold when a preset period of time elapses; and determining, in response to a determination result that the voltage is greater than or equal to the threshold when the preset period of time elapses, that the electrical parameter already meets the preset starting condition.

In an embodiment, the determining whether the electrical parameter meets the preset starting condition includes: detecting a first preset disturbance in the electrical parameter; and determining, in response to the detected first preset disturbance in the electrical parameter, that the electrical parameter already meets the preset starting condition.

In an embodiment, the electrical parameter includes a voltage. In another embodiment, the electrical parameter includes a voltage and a current.

In an embodiment, the first preset disturbance is applied to a voltage on the direct current side of the inverter in the rapid shutdown system when it is determined that at least one of the multiple photovoltaic strings on the direct current side of the inverter is under an abnormal condition after the inverter is started. In another embodiment, the first preset disturbance is applied to a current on the direct current side of the inverter in the rapid shutdown system when it is determined that at least one of the multiple photovoltaic strings on the direct current side of the inverter is under an abnormal condition after the inverter is started. In another embodiment, the first preset disturbance is applied to a voltage and a current on the direct current side of the inverter in the rapid shutdown system when it is determined that at least one of the multiple photovoltaic strings on the direct current side of the inverter is under an abnormal condition after the inverter is started.

In an embodiment, a current or power outputted by the photovoltaic string that is under the abnormal condition is equal to zero.

In an embodiment, the first preset disturbance is a continuous disturbance lasting for a preset period of time. Alternatively, the first preset disturbance is a continuous disturbance or an intermittent disturbance that exists all the time.

In an embodiment, the electrical parameter includes the voltage signal, and the first preset disturbance is a double line frequency ripple.

In an embodiment, the method further includes: operating the shutdown device to remain in a mode of limited output in response to a determination result that the electrical parameter does not meet the preset starting condition after the determining whether the electrical parameter meets the preset starting condition.

In an embodiment, the shutdown device initially starts by: switching the shutdown device on and operating the shutdown device in the mode of unlimited output by the shutdown device when a second preset disturbance is already detected in the electrical parameter at the output terminal of the shutdown device.

In an embodiment, the second preset disturbance is a preset periodic pulse.

A shutdown device for a photovoltaic module is provided according to a second aspect of the present disclosure. The shutdown device includes a switch unit, a starting voltage module, a driving circuit, a processor, a bypass diode, and a parameter sampling unit. The switch unit is arranged between a positive input terminal and a positive output terminal of the shutdown device. Alternatively, the switch unit is arranged between a negative input terminal and a negative output terminal of the shutdown device. The switch unit is configured to switch, under control of the processor, the shutdown device on or off. The parameter sampling unit is configured to sample an electrical parameter at an output terminal of the shutdown device and output the sampled electrical parameter to the processor. The starting voltage module is configured to output, under control of the processor, a starting voltage to the output terminal of the shutdown device when the shutdown device is off and under a normal condition. The bypass diode is configured to provide a current path bypassing the shutdown device when the shutdown device is off. An output terminal of the processor is connected to a control terminal of the switch unit via the driving circuit, and the processor is configured to perform the method for starting a rapid shutdown system in the first aspect of the present disclosure.

In an embodiment, the switch unit includes two switch transistors that are connected in series, and the two switch transistors are controlled by the processor via the driving circuit.

An inverter is provided according to a third aspect of the present disclosure. The inverter includes a sampling circuit, an inverter circuit, a signal processing circuit, and a controller. The sampling circuit is arranged on a direct current side of the inverter, and is configured to sample a voltage on the direct current side of the inverter and acquire a current or power outputted by each of photovoltaic strings connected in parallel. The photovoltaic strings connected in parallel are connected to the direct current side of the inverter. An output terminal of the sampling circuit is connected to an input terminal of the controller via the signal processing circuit. The controller is configured to control the inverter circuit to be connected to a grid and/or apply a disturbance to the direct current side of the inverter, for each of shutdown devices in the photovoltaic strings to perform the method for starting a rapid shutdown system in the first aspect of the present disclosure.

In an embodiment, the inverter further includes a Boost circuit arranged at a front stage of the inverter circuit. An input terminal of the Boost circuit serves as the direct current side of the inverter.

A rapid shutdown system is provided according to a fourth aspect of the present disclosure. The rapid shutdown system includes the inverter according to the third aspect of the present disclosure and multiple photovoltaic strings. The multiple photovoltaic strings are connected in parallel, and are connected to the direct current side of the inverter. Each of the photovoltaic strings includes multiple shutdown devices according to the second aspect of the present disclosure. Output terminals of the shutdown devices are connected in series to form two terminals of the photovoltaic string, and input terminals of the shutdown devices are connected to respective photovoltaic modules.

Based on the method for starting a rapid shutdown system according to the embodiments of the present disclosure, the direct current side of the inverter in the rapid shutdown system is connected to multiple photovoltaic strings that are connected in parallel. The method is applied to the rapid shutdown system after each shutdown device in the rapid shutdown system initially starts. The shutdown device is switched into a mode of unlimited output in response to its success in initially starting. The shutdown device, in response to its failure to initially start or when being switched off, samples an electrical parameter at its output terminal in real time, determines whether the electrical parameter meets a preset starting condition, and switches itself on and operates in the mode of unlimited output when the electrical parameter already meets the preset starting condition. That is, with this method, the shutdown device can determine, via only its sampling unit, whether the preset starting condition is met, and switch itself on once the preset starting condition is met. That is, no receiving device is provided for such shutdown device, and therefore the cost of the shutdown device in terms of hardware is significantly reduced compared with the conventional technology. In addition, the shutdown device can be switched on without a communication means, for example, PLC.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing the embodiments of the present disclosure, and those skilled in the art may obtain other drawings according to the drawings without any creative effort.

DETAILED DESCRIPTION OF EMBODIMENTS

Technical solutions of embodiments of the present disclosure are completely and clearly described below in conjunction with the drawings of the embodiments of the present disclosure. Apparently, the embodiments described below are only some embodiments, rather than all of the embodiments of the present disclosure. All other embodiments obtained by those skilled in the art based on the embodiments in the present disclosure without any creative effort fall within the protection scope of the present disclosure.

In the present disclosure, terms "include", "comprise" or any other variants thereof are intended to be non-exclusive. Therefore, a process, method, article or device including a series of elements includes not only the elements but also other elements that are not enumerated or elements inherent in the process, method, article or device. Unless expressively limited otherwise, a process, method, article or device defined by "comprising/including a(n) . . . " does not exclude existence of another identical element in the process, method, article or device.

A method for starting a rapid shutdown system is provided according to an embodiment of the present disclosure, in order to solve the problem of high cost of a shutdown device in terms of hardware due to an additional receiving module indispensable to the shutdown device when being started in the existing manner.

Figure 7:
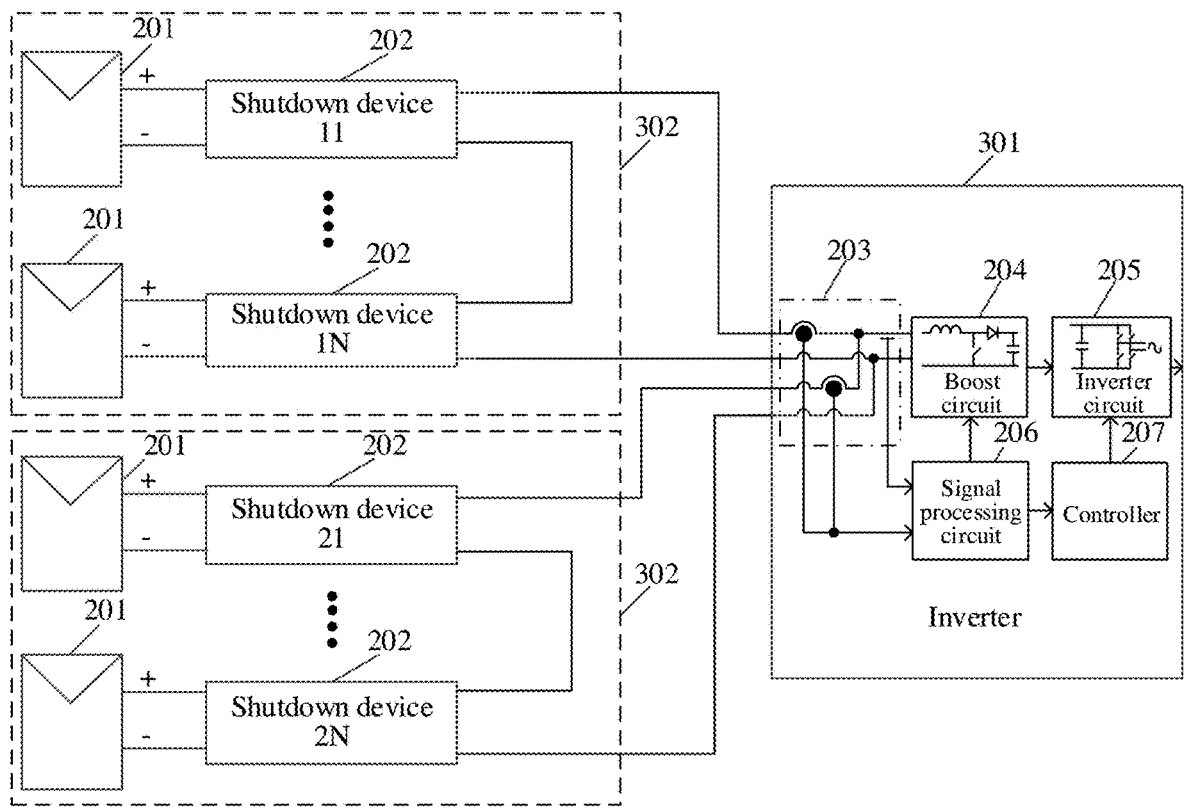
FIG. 7 is a schematic structural diagram illustrating a rapid shutdown system according to an embodiment of the present disclosure.

As shown in FIG. 7, the rapid shutdown system includes an inverter 301 and multiple photovoltaic strings 302. The multiple photovoltaic strings 302 are connected in parallel, and then are connected to the inverter 301 on a direct current side of the inverter 301. Each of the multiple photovoltaic strings 302 includes multiple shutdown devices 202, output terminals of the multiple shutdown devices 202 are connected in series to form two terminals of the photovoltaic string 302, and input terminals of the multiple shutdown devices 202 are connected to respective photovoltaic modules 201.

Figure 1:
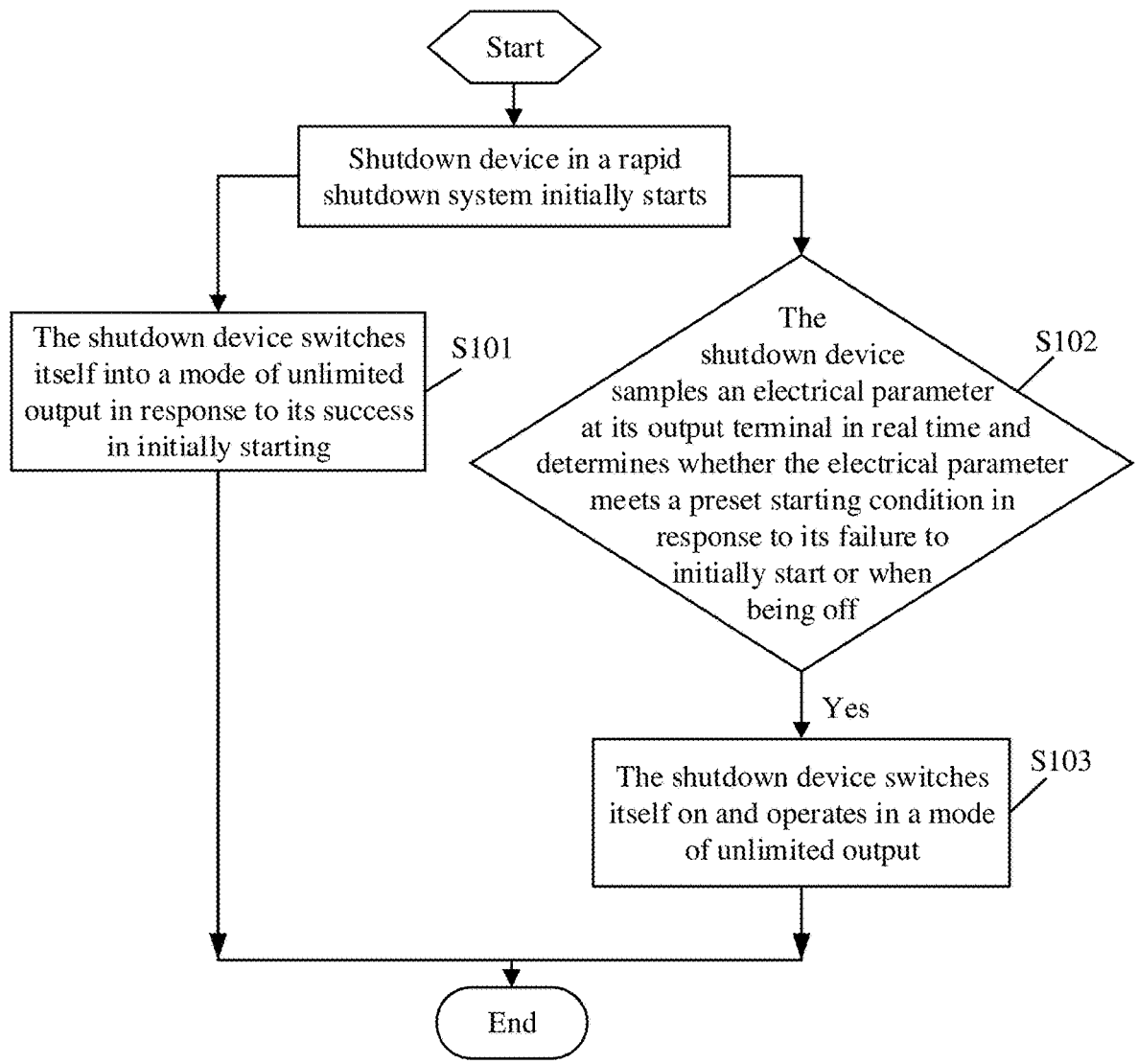
FIG. 1 is a flowchart illustrating a method for starting a rapid shutdown system according to an embodiment of the present disclosure.

FIG. 1 illustrates a method for starting the rapid shutdown system according to another embodiment of the present disclosure. The method is applied to the rapid shutdown system after each shutdown device in the rapid shutdown system initially starts, and includes the following steps S101 to S103.

In step S101, the shutdown device is switched into a mode of unlimited output in response to its success in initially starting.

In practice, the shutdown device in the rapid shutdown system initially starts, that is, the shutdown device is switched from a mode of limited output to a mode of unlimited output for the first time.

The shutdown device initially starts as follows. The shutdown device, when successfully detecting a second preset disturbance in an electrical parameter at its output terminal, starts and switches itself into the mode of unlimited output. The second preset disturbance is a preset periodic pulse.

In other words, the shutdown device in the rapid shutdown system initially starts in response to the preset periodic pulse generated when the inverter in the rapid shutdown system periodically short-circuits its direct current side. A voltage across a direct current bus in the rapid shutdown system is equal to zero when the direct current side of the inverter is short-circuited. The voltage across the direct current bus is equal to a voltage of the photovoltaic string when the direct current side of the inverter is not short-circuited.

It should be noted that through the shutdown device operating in the mode of unlimited output, electric energy generated by the photovoltaic module connected to the shutdown device can be transferred to the inverter and thence to a grid.

In step S102, the shutdown device, in response to its failure to initially start or when being switched off, samples an electrical parameter at its output terminal in real time, and determines whether the electrical parameter meets a preset starting condition.

In practice, the shutdown device that fails to start or is switched off remains in the mode of limited output. That is, the shutdown device in this case is off, and therefore the photovoltaic module connected to this shutdown device is disconnected from the inverter, resulting in failure of the photovoltaic module to output power through the inverter.

The shutdown device that fails to start does not start successfully at the beginning. The shutdown device that is switched off starts successfully at the beginning and then is switched off when the photovoltaic string stops outputting power since the voltage across the direct current bus in the photovoltaic string is lower than a nominal voltage of the inverter under abnormal conditions, for example, the photovoltaic string is shaded or is unplugged by mistake It should be noted that the shutdown device acquires the electrical parameter at its output terminal via its parameter sampling unit in real time, and determines via its processor whether the acquired electrical parameter meets the preset starting condition.

The method proceeds to step S103 when the shutdown device determines that the electrical parameter already meets the preset starting condition.

In step S103, the shutdown device switches itself on and operates in the mode of unlimited output.

In practice, after the shutdown device that fails to start or is switched off switches itself on and operates in the mode of unlimited output, the photovoltaic module connected to the shutdown device can output power through the inverter.

As described above, the shutdown device according to this embodiment can determine, via only its sampling unit, whether the preset starting condition is met, and switch itself on once the preset starting condition is met. That is, no receiving device is provided for such shutdown device, and therefore the cost of the shutdown device in terms of hardware is significantly reduced compared with the conventional technology. In addition, the shutdown device can be switched on without a communication means, for example, PLC.

It should be noted that there is an optimized solution in the conventional technology for switching on the shutdown device based on a change in the voltage across the direct current bus. The shutdown device involved in this solution has relatively low cost in terms of hardware. However, this solution does not serve a photovoltaic module under abnormal conditions, for example, when the photovoltaic module is shaded. A photovoltaic string including the shutdown device that fails to start may output a voltage less than a voltage for starting the inverter, and therefore fails to output power via the inverter. Other photovoltaic strings under normal conditions can start successfully and output power. In this case, the inverter has to be restarted in order to switch on the shutdown device that fails to start, resulting in a serious loss of power production.

With the solution according to the present disclosure, the shutdown device that fails to start or is switched off, in order to switch itself on, samples the electrical parameter at its output terminal in real time and determines whether the electrical parameter meets the preset starting condition only. It is unnecessary to restart the inverter, thereby preventing the power production from being decreased. Further, the rapid shutdown system can stably operate.

Figure 2:
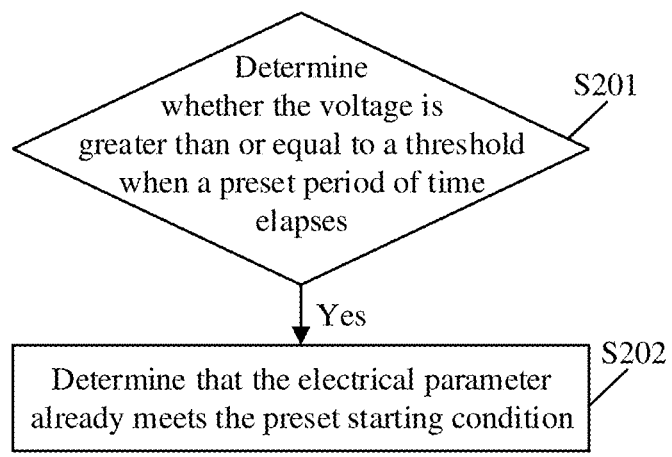
FIG. 2 is a flowchart illustrating determination of whether an electrical parameter meets a preset starting condition according to an embodiment of the present disclosure.

It is found that when all shutdown devices in a photovoltaic string in the rapid shutdown system are on, that is, when the photovoltaic string operates in the mode of unlimited output, the voltage across the direct current bus in the rapid shutdown system is equal to a sum of voltages outputted by the shutdown devices that are on. The voltage across the direct current bus is distributed among output terminals of photovoltaic modules in the mode of limited output. When the voltage across the direct current bus reaches the voltage for starting the inverter, the inverter starts and is connected to the grid, and then the voltage at the output terminal of the shutdown device in the mode of limited output remains constant. The voltage across the direct current bus, when failing to reach the voltage for starting the inverter, drops below a safe voltage within a certain period of time, for example, 30 s, and then the voltage at the output terminal of the shutdown device in the mode of limited output decreases to be less than a threshold. In view of the above, in a case that the electrical parameter includes the voltage, details about step S102 in which the shutdown device that fails to start or is switched off samples the electrical parameter at its output terminal in real time and determines whether the electrical parameter meets the preset starting condition are illustrated in FIG. 2 with steps S201 and S202.

In step S201, the shutdown device determines whether the sampled voltage is greater than or equal to the threshold when a preset period of time elapses.

The preset period of time depends on application scenarios and user requirements. For example, the preset period of time is set to 30 s, 45 s, 60 s, or even 1 min or 5 min. Details about the preset period of time is not limited in the present disclosure, as long as safety requirements of the system is met.

Similarly, the threshold depends on application scenarios and user requirements, as long as the inverter is in operation when the voltage outputted by the shutdown device is greater than or equal to the threshold.

The method proceeds to step S202 in response to a determination result that the voltage is greater than or equal to the threshold when the preset period of time elapses. The shutdown device determines, in response to a determination result that the voltage is less than the set threshold when the preset period of time elapses, that the electrical parameter does not meet the preset starting condition.

In step S202, the shutdown device determines that the electrical parameter already meets the preset starting condition.

In this embodiment, the shutdown device that fails to start or is switched off samples the voltage at its output terminal in real time and determines whether the sampled voltage is greater than or equal to the set threshold when the preset period of time elapses, that is, whether the sampled voltage meets the preset starting condition, in order to switch itself on.

Figure 3:
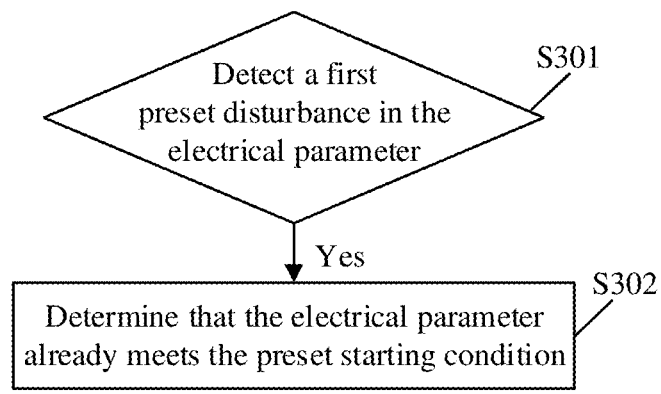
FIG. 3 is a flowchart illustrating determination of whether the electrical parameter meets the preset starting condition according to another embodiment of the present disclosure.

In practice, when the inverter operates normally, the voltage across the direct current bus in the rapid shutdown system is too high to periodically switch off the inverter in order to switch on the shutdown device that is operating in the mode of limited output. That is, it is impossible to for the shutdown device that fails to start or is switched off to be switched on by periodically short circuiting the direct current side of the inverter. In order to solve the above problem, details about step S201 in which the shutdown device determines whether the electrical parameter meets the preset starting condition are illustrated in FIG. 3 with the following steps S301 and 302 according to another embodiment of the present disclosure.

In step S301, the shutdown device detects a first preset disturbance in the electrical parameter.

In practice, the first preset disturbance is applied to the voltage or current on the direct current side of the inverter in the rapid shutdown system when the inverter, after being started, determines that at least one of the multiple photovoltaic strings on its direct current side is under abnormal conditions. Alternatively, the first preset disturbance is applied to the voltage and the current on the direct current side of the inverter in the rapid shutdown system when the inverter, after being started, determines that at least one of the multiple photovoltaic strings on its direct current side is under abnormal conditions.

It should be noted that when a photovoltaic module in the rapid shutdown system is shaded, a shutdown device connected to this photovoltaic module may fail to start. As a result, a voltage outputted by a photovoltaic string including this photovoltaic module fails to reach the voltage for starting the inverter. In this case, the current or power outputted by the photovoltaic string is equal to zero. Therefore, a sampling circuit arranged in the photovoltaic string on the direct current side of the inverter samples the current or power outputted by the photovoltaic string, and the inverter determines whether the photovoltaic string is under abnormal conditions based on a result of whether the current or power is equal to zero.

That is, the photovoltaic string under abnormal conditions outputs zero current or zero power.

In practice, the first preset disturbance may be a continuous disturbance lasting for a preset period of time. That is, the continuous disturbance exists until the shutdown device is successfully started. The continuous disturbance stops when the inverter detects the unlimited output of the photovoltaic string. The preset period of time depends on application scenarios and user requirements. For example, the preset period of time is set to tens of seconds, such as 10 s and 30 s, or a few minutes. Alternatively, the first preset disturbance is a continuous disturbance or an intermittent disturbance that exists all the time. That is, the continuous disturbance or intermittent disturbance still exists after the shutdown device is successfully started.

Figure 8:
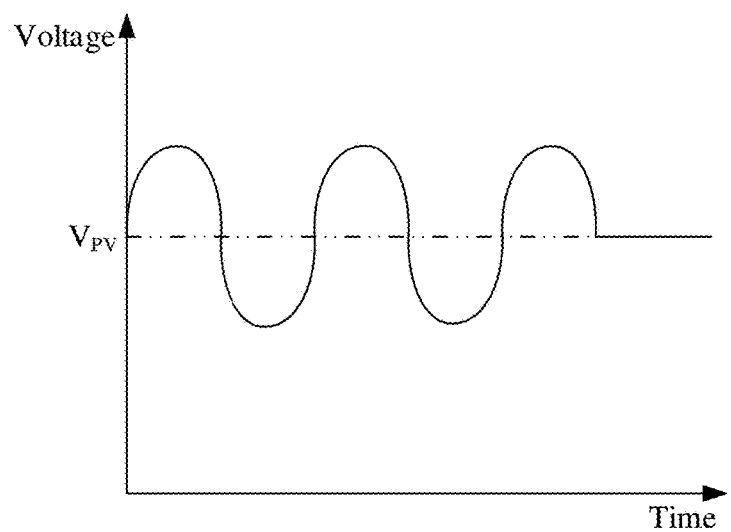
FIG. 8 is a schematic diagram illustrating a double line frequency ripple according to an embodiment of the present disclosure.
Figure 9:
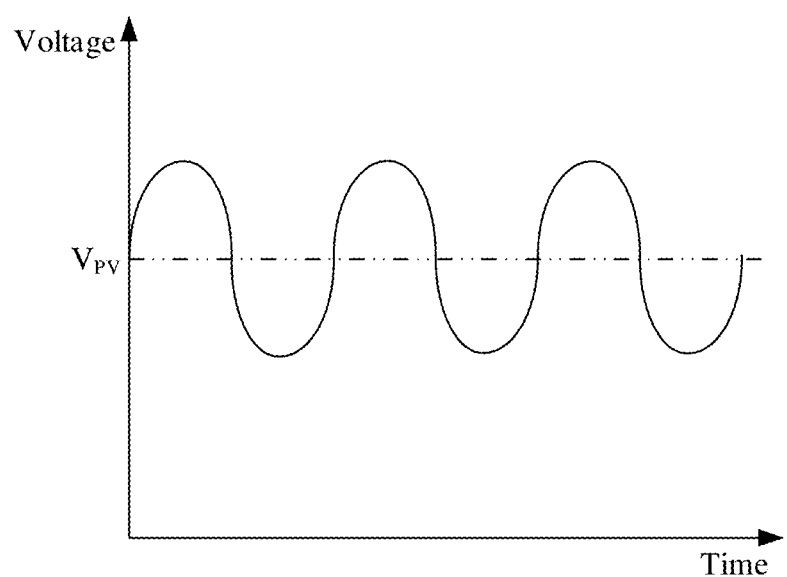
FIG. 9 is a schematic diagram illustrating a continuous double line frequency ripple according to an embodiment of the present disclosure.
Figure 10:
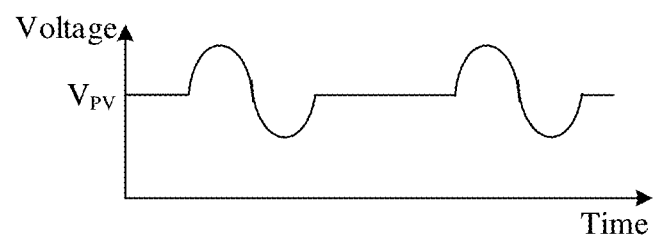
FIG. 10 is a schematic diagram illustrating an intermittent double line frequency ripple according to an embodiment of the present disclosure.

Specifically, the first preset disturbance may be, for example, a double line frequency ripple as shown in FIG. 9. In practice, the first preset disturbance signal may be the continuous disturbance lasting for the preset period of time as shown in FIG. 8 or an intermittent disturbance as shown in FIG. 10, depending on application scenarios and user requirements.

It should be noted that details about the preset disturbance signal are not limited in the present disclosure, as long as the preset disturbance signal is detectable by the shutdown device.

In practice, the electrical parameter includes the voltage. Alternatively, the electrical parameter includes the voltage and the current. FIG. 8 to FIG. 10 each illustrate a case where the electric parameter includes the voltage. In practice, details about the electrical parameter depend on application scenarios and user requirements.

The method proceeds to step S302 when the first preset disturbance is successfully detected in the electrical parameter. When no first preset disturbance is detected in the electrical parameter, the shutdown device determines that the electrical parameter does not meet the preset starting condition.

In step S302, the shutdown device determines that the electrical parameter already meets the preset starting condition.

In this embodiment, the shutdown device determines whether the electrical parameter meets the preset starting condition by detecting the first preset disturbance in the electrical parameter, so as to solve the problem that the voltage across the direct current bus in the rapid shutdown system is too high to periodically switch off the inverter in order to switch on the shutdown device that is operating in the mode of limited output when the inverter operates normally.

Figure 4:
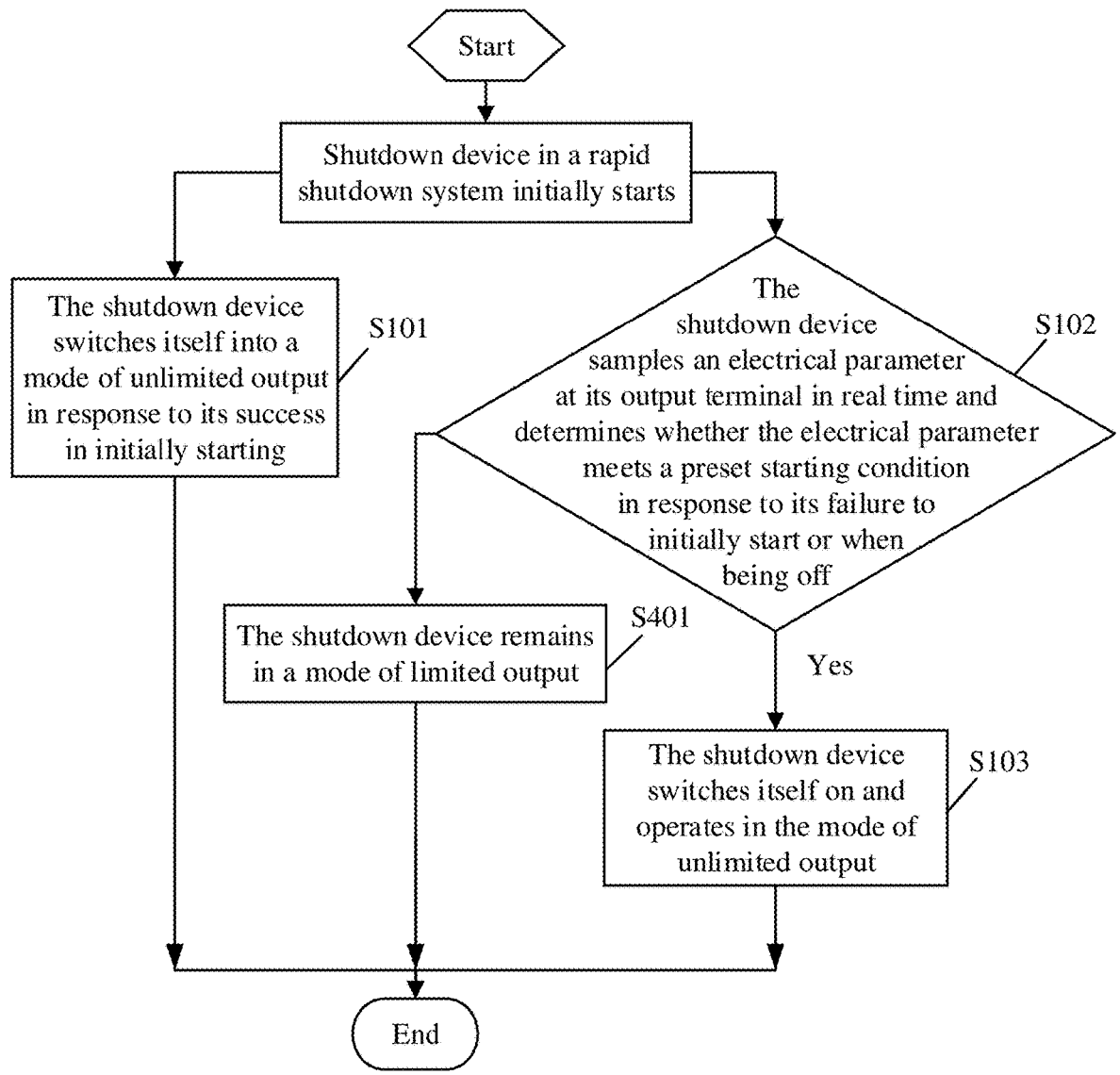
FIG. 4 is a flowchart illustrating a method for starting a rapid shutdown system according to another embodiment of the present disclosure.

In another embodiment according to the present disclosure, after step S102 in which the shutdown device that fails to start or is switched off samples the electrical parameter at its output terminal in real time and determines whether the electrical parameter meets the preset starting condition, the method proceeds to the following step S401 when the shutdown device determines that the electrical parameter does not meets the preset starting condition, as shown in FIG. 4.

In step S401, the shutdown device remains in the mode of limited output.

In practice, the shutdown device determines that the electrical parameter does not meet the preset starting condition when determining that the voltage is less than the threshold when the preset period of time elapses or when no first preset disturbance is detected in the electrical parameter. In this case, the shutdown device is impossible to switch itself on, and therefore remains in the mode of limited output.

Figure 5:
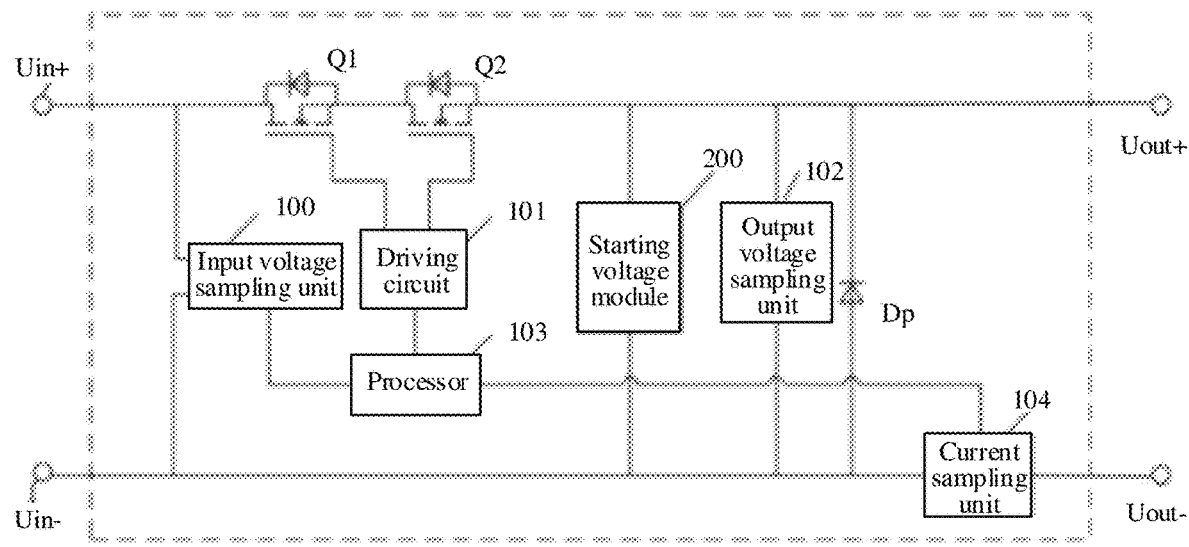
FIG. 5 is a schematic structural diagram illustrating a shutdown device according to an embodiment of the present disclosure.

Based on the above embodiments, a shutdown device for a photovoltaic module is further provided according to another embodiment of the present disclosure. Referring to FIG. 5, the shutdown device includes a switch unit (including Q1 and Q2), a starting voltage module 200, a driving circuit 101, a processor 103, a bypass diode Dp and a parameter sampling unit (including an input voltage sampling unit 100, an output voltage sampling unit 102 and a current sampling unit 104).

The switch unit is arranged between a positive input terminal and a positive output terminal of the shutdown device (as shown in FIG. 5). Alternatively, the switch unit is arranged between a negative input terminal and a negative output terminal of the shutdown device (not shown in the drawings). The switch unit is configured to switch, under control of the processor 103, on or off the shutdown device.

In practice, as shown in FIG. 5, the switch unit in the shutdown device includes two switch transistors (Q1 and Q2) that are connected to each other. The two switch transistors are controlled by the processor 103 via the driving circuit 101. Multiple switch transistors may be connected in series and/or parallel, depending on actual situations.

As shown in FIG. 5, the number of the switch transistors equal to two, for example. An input terminal of the switch transistor Q1 serves as an input terminal of the switch unit, and is connected to the positive input terminal Uin+ of the shutdown device. An output terminal of the switch transistor Q1 is connected to an input terminal of the switch transistor Q2. An output terminal of the switch transistor Q2 serves as an output terminal of the switch unit. Control terminals of the switch transistors Q1 and Q2 serve as a control terminal of the switch unit.

It should be noted that the switch transistors Q1 and Q2 each are a semiconductor switch device, for example, MOSFET (metal-oxide-semiconductor field-effect transistor) or IGBT (insulated gate bipolar transistor). FIG. 5 shows the MOSFET as the switch transistor, for example. Details about the case that the switch transistor is the IGBT are similarly, and thus are not described herein.

The parameter sampling unit includes at least one of the output voltage sampling unit 102 and the current sampling unit 104, and further the input voltage sampling unit 100. The parameter sampling unit is configured to sample at least an electrical parameter at an output terminal of the shutdown device and output the sampled electrical parameter to the processor 103.

In practice, the parameter sampling unit samples at least one of a current and a voltage outputted by the shutdown device, and further a voltage inputted to the shutdown device, depending on practical situations. What the parameter sampling unit samples is not limited in the present disclosure.

The starting voltage module 200 is configured to output, under control of the processor 103, a starting voltage to the output terminal of the shutdown device, when the shutdown device is off and under normal conditions, for the inverter to acquire, by detecting the voltage across the direct current bus, the maximum number of shutdown devices under a normal condition included in the corresponding photovoltaic string.

In practice, a positive output terminal of the starting voltage module 200 is connected to the positive output terminal of the shutdown device, and a negative output terminal of the starting voltage module 200 is connected to the negative output terminal of the shutdown device.

It should be noted that the starting voltage module 200 has internal resistance. The output end of the shutdown device may be short-circuited, that is, the starting voltage module 200 is short-circuited and therefore outputs zero voltage.

The bypass diode Dp is configured to a current path bypassing the shutdown device when the shutdown device is off. An anode of the bypass diode Dp is connected to the negative output terminal Uout− of the shutdown device. A cathode of the bypass diode Dp is connected to the positive output terminal Uout+ of the shutdown device.

An output terminal of the processor 103 is connected to the control terminal of the switch unit via the driving circuit 101. The processor 103 is configured to perform the method for starting the rapid shutdown system according to any one of the above embodiments.

It should be noted that details that the shutdown device performs the method for starting the rapid shutdown system can refer to the above embodiments of the method for starting the rapid shutdown system, and thus are described here.

In this embodiment, the shutdown device can switch itself on or off based on only the electrical parameter sampled by its parameter sampling unit. No communication signal indicating to switch on or off the shutdown device from the inverter is involved and therefore no signal receiving device for receiving the communication signal is provided for the shutdown device, thereby significantly reducing the cost of the shutdown device in terms of hardware.

Figure 6:
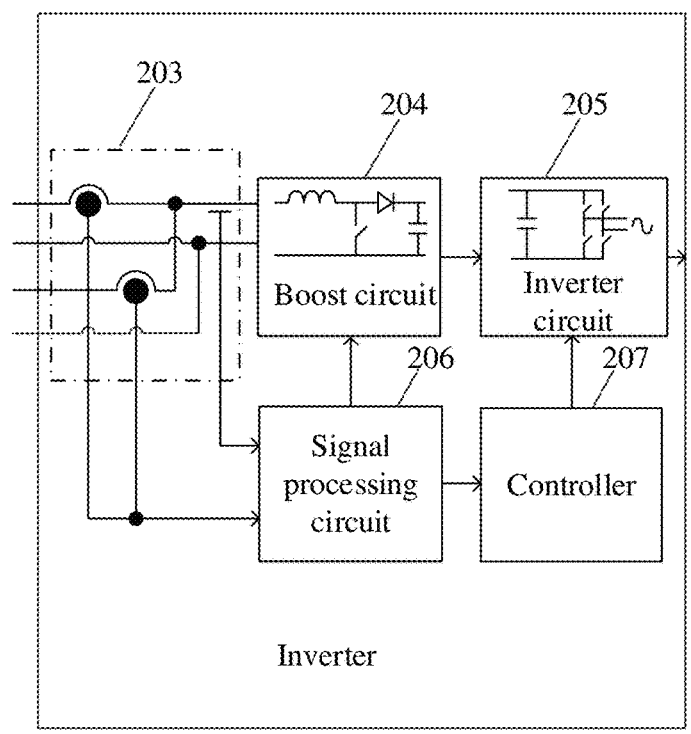
FIG. 6 is a schematic structural diagram illustrating an inverter according to an embodiment of the present disclosure.

Based on the above embodiments, an inverter is further provided according to another embodiment of the present disclosure. Referring to FIG. 6, the inverter includes a sampling circuit 203, an inverter circuit 205, a signal processing circuit 206 and a controller 207.

The sampling circuit 203 is arranged on a direct current side of the inverter, and is configured to sample a voltage on the direct current side of the inverter and acquire a current or power outputted by each of photovoltaic strings connected in parallel. The photovoltaic strings connected in parallel are connected to the inverter.

An output terminal of the sampling circuit 203 is connected to an input terminal of the controller 207 via the signal processing circuit 206.

The controller 207 is configured to control the inverter circuit 205 to operate, for the inverter circuit to be connected to a grid and/or apply a disturbance to the direct current side of the inverter, so that each of shutdown devices in the photovoltaic strings to perform the method for starting a rapid shutdown system according to any one of the above embodiments.

In practice, the controller 207 controls the inverter circuit 205 to be switched off periodically so as to generate a second preset disturbance, or the controller 207 controls the inverter circuit 205 to operate so as to apply a first preset disturbance to the direct current side of the inverter, depending on application scenarios and user requirements, and which is not limited herein.

It should be noted that details about operation of the inverter can refer to the above embodiments of the method for starting the rapid shutdown system, and thus are not described here.

In practice, as shown in FIG. 6, the inverter further includes a Boost circuit 204 arranged at a front stage of the inverter circuit 205. An input terminal of the Boost circuit 204 serves as the direct current side of the inverter.

It should be noted that the Boost circuit 204 may be a three-level flying capacitor boost circuit or the like, which is not limited in the present disclosure.

In this embodiment, the inverter controls, via the controller 207, the inverter circuit 205 to be periodically switched off to generate the second preset disturbance, so as to initially start the shutdown devices connected to the direct current side of the inverter. The controller 207 controls the inverter circuit 205 to generate the first preset disturbance, so as to switch on the shutdown device that fails to initially start or is switched off. Therefore, no additional device is arranged on the direct current bus in the present disclosure compared with the conventional method in which a unit for sending a starting signal is indispensable to the shutdown device. Further, it is unnecessary to arrange a direct current combiner box with a large volume or an additional direct current combiner box, thereby reducing construction cost. In addition, the shutdown device can be switched on without a communication means, for example, PLC.

Based on the above embodiments, a rapid shutdown system is further provided according to another embodiment of the present disclosure. As shown in FIG. 7, the rapid shutdown system includes the inverter 301 described in any one of the above embodiments and multiple photovoltaic strings 302. The multiple photovoltaic strings 302 are connected in parallel, and are connected to the direct current side of the inverter 301.

Each of the multiple photovoltaic strings 302 includes multiple shutdown devices 202 as described in any one of the above embodiments. Output terminals of the respective shutdown devices 202 are connected in series to form two terminals of the photovoltaic string 302. Input terminals of the shutdown devices 202 are connected to respective photovoltaic modules 201.

In practice, in each of the multiple photovoltaic strings 302 in the rapid shutdown system, all photovoltaic modules 201 in the photovoltaic string 302 are connected in series through the shutdown devices 202, and a voltage across the two terminals of the photovoltaic string 302 is equal to the voltage across the direct current bus.

It should be noted that the input terminal of each shutdown device 202 is generally connected to one photovoltaic module 201. Apparently, the number of photovoltaic modules 201 connected to the input terminal of each shutdown device 202 is not limited to one. Each shutdown device 202 may be connected to multiple photovoltaic modules, depending on application scenarios and user requirements. For example, each shutdown device is connected to two photovoltaic modules.

It should further be noted that details about operation of the rapid shutdown system can refer to the above embodiments of the method for starting the rapid shutdown system, the shutdown device, and the inverter, and thus are not described herein.

In this embodiment, the inverter 301 and the shutdown device 202 cooperate to control the rapid shutdown system to start, which is well applicable to the industry including both the inverter 301 and the shutdown device 202. In addition, the inverter 301 and the shutdown device 202 in the rapid shutdown system have low costs in terms of hardware, and therefore the rapid shutdown system has a low cost in terms of hardware.

The embodiments in this specification are described in a progressive manner, the same and similar parts between embodiments may be referred to each other, and each embodiment focuses on the differences from other embodiments. In particular, since the system or the embodiment of the system is similar to the embodiment of the method, the description of the system or the embodiment of the system is simple, and reference may be made to the relevant part of the embodiment of the method. The system and the embodiments of the system described above are only illustrative. Units described as separated components may be or not be physically separated. Components shown as units may be physical units or not, i.e. the components may be arranged in a same place or may be distributed among multiple network units. Some or all modules thereof may be selected to implement the solution in the embodiments, depending on application scenarios. This can be understood and implemented by skilled in the art without any creative work.

It should further be known by those skilled in the art that, units and steps in examples described in conjunction with the embodiments disclosed herein can be implemented by electronic hardware, computer software or a combination thereof. In order to clearly explain interchangeability of the hardware and the software, steps and units of each example have been described generally in terms of functions in the above specification. Whether these functions are implemented by hardware or software depends on the specific application and design constraints for the technical solution. Those skilled in the art may implement the described functions in various manners for each particular application, and such implementation should not be regarded as going beyond the scope of the present disclosure.

According to the embodiments disclosed above, those skilled in the art can implement or use the present disclosure. Those skilled in the art can readily think of various modifications to the embodiments. General principles defined in the present disclosure may be implemented in other embodiments without departing from the spirit or scope of the present disclosure. Therefore, the present disclosure shall not be limited to the embodiments described herein but have the widest scope that complies with the principle and novelty disclosed in the present disclosure.

It should also be noted that in the specification, relational terms such as "first", "second" and the like are merely used for distinguishing one entity or operation from another, rather than indicating or implying an actual relationship or order of these entities or operations. Furthermore, terms "include", "comprise" or any other variants thereof are intended to be non-exclusive. Therefore, a process, method, article or device including a series of elements includes not only the elements but also other elements that are not enumerated or other elements inherent in the process, method, article or device. Unless expressively limited otherwise, a process, method, article or device defined by "comprising/including a(n) . . . " does not exclude existence of another identical element in the process, method, article or device.

The invention claimed is:

1. A method for starting a rapid shutdown system, wherein a plurality of photovoltaic strings are connected in parallel on a direct current side of an inverter in the rapid shutdown system, and the method comprises:
   after each of shutdown devices in the rapid shutdown system initially starts,
   switching the shutdown device into a mode of unlimited output by the shutdown device in response to success of the shutdown device in initially starting; and
   sampling an electrical parameter at an output terminal of the shutdown device in real time, determining whether the electrical parameter meets a preset starting condition, switching the shutdown device on and operating the shutdown device in the mode of unlimited output in response to a determination result that the electrical parameter already meets the preset starting condition, by the shutdown device in response to failure of the shutdown device to start or when the shutdown device is switched off.

2. The method for starting a rapid shutdown system according to claim 1, wherein the electrical parameter comprises a voltage, and the determining whether the electrical parameter meets the preset starting condition comprises:
   determining whether the voltage is greater than or equal to a threshold when a preset period of time elapses; and
   determining, in response to a determination result that the voltage is greater than or equal to the threshold when the preset period of time elapses, that the electrical parameter already meets the preset starting condition.

3. The method for starting a rapid shutdown system according to claim 1, wherein the determining whether the electrical parameter meets the preset starting condition comprises:
   detecting a first preset disturbance in the electrical parameter; and
   determining, in response to the detected first preset disturbance in the electrical parameter, that the electrical parameter already meets the preset starting condition.

4. The method for starting a rapid shutdown system according to claim 3, wherein
   the electrical parameter comprises a voltage; or
   the electrical parameter comprises a voltage and a current.

5. The method for starting a rapid shutdown system according to claim 3, wherein
   the first preset disturbance is applied to a voltage on the direct current side of the inverter in the rapid shutdown system when it is determined that at least one of the plurality of photovoltaic strings on the direct current side of the inverter is under an abnormal condition after the inverter is started;
   the first preset disturbance is applied to a current on the direct current side of the inverter in the rapid shutdown system when it is determined that at least one of the plurality of photovoltaic strings on the direct current side of the inverter is under an abnormal condition after the inverter is started; or
   the first preset disturbance is applied to a voltage and a current on the direct current side of the inverter in the rapid shutdown system when it is determined that at least one of the plurality of photovoltaic strings on the direct current side of the inverter is under an abnormal condition after the inverter is started.

6. The method for starting a rapid shutdown system according to claim 5, wherein
   a current or power outputted by the photovoltaic string that is under the abnormal condition is equal to zero.

7. The method for starting a rapid shutdown system according to claim 3, wherein
   the first preset disturbance is a continuous disturbance lasting for a preset period of time; or
   the first preset disturbance is a continuous disturbance or an intermittent disturbance that exists all the time.

8. The method for starting a rapid shutdown system according to claim 7, wherein the first preset disturbance is a double line frequency ripple.

9. The method for starting a rapid shutdown system according to claim 1, further comprising:
   operating the shutdown device to remain in a mode of limited output in response to a determination result that the electrical parameter does not meet the preset starting condition after the determining whether the electrical parameter meets the preset starting condition.

10. The method for starting a rapid shutdown system according to claim 1, wherein the shutdown device initially starts by:
    switching the shutdown device on and operating the shutdown device in the mode of unlimited output by the shutdown device when a second preset disturbance is already detected in the electrical parameter at the output terminal of the shutdown device.

11. The method for starting a rapid shutdown system according to claim 10, wherein the second preset disturbance is a preset periodic pulse.

12. A shutdown device for a photovoltaic module, comprising:
    a switch unit;
    a starting voltage module;
    a driving circuit;
    a processor;
    a bypass diode; and
    a parameter sampling unit, wherein
    the switch unit is arranged between a positive input terminal and a positive output terminal of the shutdown device or is arranged between a negative input terminal and a negative output terminal of the shutdown device, and is configured to switch, under control of the processor, the shutdown device on or off;
    the parameter sampling unit is configured to sample an electrical parameter at an output terminal of the shutdown device and output the sampled electrical parameter to the processor;
    the starting voltage module is configured to output, under control of the processor, a starting voltage to the output terminal of the shutdown device when the shutdown device is off and under a normal condition;
    the bypass diode is configured to provide a current path bypassing the shutdown device when the shutdown device is off; and
    an output terminal of the processor is connected to a control terminal of the switch unit via the driving circuit, and the processor is configured to perform the method for starting a rapid shutdown system according to claim 1.

13. The shutdown device for a photovoltaic module according to claim 12, wherein the switch unit comprises two switch transistors that are connected in series, and the two switch transistors are controlled by the processor via the driving circuit.

14. An inverter, comprising:
a sampling circuit;
an inverter circuit;
a signal processing circuit; and
a controller, wherein
the sampling circuit is arranged on a direct current side of the inverter, and is configured to sample a voltage on the direct current side of the inverter and acquire a current or power outputted by each of photovoltaic strings connected in parallel, wherein the photovoltaic strings connected in parallel are connected to the direct current side of the inverter;
an output terminal of the sampling circuit is connected to an input terminal of the controller via the signal processing circuit; and
the controller is configured to control the inverter circuit to be connected to a grid and/or apply a disturbance to the direct current side of the inverter, for each of shutdown devices in the photovoltaic strings to perform the method for starting a rapid shutdown system according to claim 1.

15. The inverter according to claim 14, further comprising:
a Boost circuit arranged at a front stage of the inverter circuit, wherein an input terminal of the Boost circuit serves as the direct current side of the inverter.

16. A rapid shutdown system, comprising
the inverter according to claim 14; and
a plurality of photovoltaic strings connected in parallel on the direct current side of the inverter, wherein each of the plurality of photovoltaic strings comprises a plurality of shutdown devices, output terminals of the shutdown devices are connected in series to form two terminals of the photovoltaic string, and input terminals of the shutdown devices are connected to respective photovoltaic modules, wherein each of the plurality of the shutdown devices comprises:
a switch unit;
a starting voltage module;
a driving circuit;
a processor;
a bypass diode; and
a parameter sampling unit, wherein
the switch unit is arranged between a positive input terminal and a positive output terminal of the shutdown device or is arranged between a negative input terminal and a negative output terminal of the shutdown device, and is configured to switch, under control of the processor, the shutdown device on or off;
the parameter sampling unit is configured to sample an electrical parameter at an output terminal of the shutdown device and output the sampled electrical parameter to the processor;
the starting voltage module is configured to output, under control of the processor, a starting voltage to the output terminal of the shutdown device when the shutdown device is off and under a normal condition;
the bypass diode is configured to provide a current path bypassing the shutdown device when the shutdown device is off; and
an output terminal of the processor is connected to a control terminal of the switch unit via the driving circuit.

17. The rapid shutdown system according to claim 16, wherein the switch unit comprises two switch transistors that are connected in series, and the two switch transistors are controlled by the processor via the driving circuit.

18. A rapid shutdown system, comprising
the inverter according to claim 15; and
a plurality of photovoltaic strings connected in parallel on the direct current side of the inverter, wherein each of the plurality of photovoltaic strings comprises a plurality of shutdown devices, output terminals of the shutdown devices are connected in series to form two terminals of the photovoltaic string, and input terminals of the shutdown devices are connected to respective photovoltaic modules, wherein each of the plurality of the shutdown devices comprises:
a switch unit;
a starting voltage module;
a driving circuit;
a processor;
a bypass diode; and
a parameter sampling unit, wherein
the switch unit is arranged between a positive input terminal and a positive output terminal of the shutdown device or is arranged between a negative input terminal and a negative output terminal of the shutdown device, and is configured to switch, under control of the processor, the shutdown device on or off;
the parameter sampling unit is configured to sample an electrical parameter at an output terminal of the shutdown device and output the sampled electrical parameter to the processor;
the starting voltage module is configured to output, under control of the processor, a starting voltage to the output terminal of the shutdown device when the shutdown device is off and under a normal condition;
the bypass diode is configured to provide a current path bypassing the shutdown device when the shutdown device is off; and
an output terminal of the processor is connected to a control terminal of the switch unit via the driving circuit.

19. The rapid shutdown system according to claim 18, wherein the switch unit comprises two switch transistors that are connected in series, and the two switch transistors are controlled by the processor via the driving circuit.

\* \* \* \* \*